(12) United States Patent
Wang et al.

(10) Patent No.: US 12,457,564 B2
(45) Date of Patent: Oct. 28, 2025

(54) METHOD FOR TRANSMITTING POWER HEADROOM, TERMINAL DEVICE, AND NETWORK DEVICE

(71) Applicant: VIVO MOBILE COMMUNICATION CO., LTD., Dongguan (CN)

(72) Inventors: Yuanyuan Wang, Dongguan (CN); Ye Si, Dongguan (CN); Huaming Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 463 days.

(21) Appl. No.: 17/955,495

(22) Filed: Sep. 28, 2022

(65) Prior Publication Data
US 2023/0027631 A1 Jan. 26, 2023

Related U.S. Application Data

(63) Continuation of application No. PCT/CN2021/083219, filed on Mar. 26, 2021.

(30) Foreign Application Priority Data

Mar. 31, 2020 (CN) .......................... 202010246507.0

(51) Int. Cl.
*H04W 52/36* (2009.01)
*H04L 5/00* (2006.01)
*H04W 52/24* (2009.01)

(52) U.S. Cl.
CPC ......... *H04W 52/365* (2013.01); *H04L 5/0051* (2013.01); *H04W 52/242* (2013.01); *H04W 52/367* (2013.01)

(58) Field of Classification Search
CPC ............. H04W 52/365; H04W 52/242; H04W 52/367; H04L 5/0051
See application file for complete search history.

(56) References Cited

U.S. PATENT DOCUMENTS

2015/0011236 A1 1/2015 Kazmi et al.
2016/0037550 A1* 2/2016 Barabell ............... H04B 17/318
455/450

(Continued)

FOREIGN PATENT DOCUMENTS

CN 109803363 A 5/2019
CN 110351822 A 10/2019

(Continued)

OTHER PUBLICATIONS

International Search Report issued in corresponding International Application No. PCT/CN2021/083219, mailed Jun. 9, 2021, 4 pages.

(Continued)

*Primary Examiner* — John J Lee
(74) *Attorney, Agent, or Firm* — IPX PLLC

(57) ABSTRACT

A method for transmitting a power headroom, a terminal device, and a network device are provided. The method includes: sending a power headroom PH value of a serving cell to a network device, where the PH value is a first PH value of a first sounding reference signal SRS and/or a second PH value of a second SRS; and the first PH value is obtained based on first configuration information of the first SRS, the first SRS is an SRS used for positioning, and the second SRS is an SRS used for measurement.

20 Claims, 9 Drawing Sheets

(56) References Cited

U.S. PATENT DOCUMENTS

2018/0167895 A1* 6/2018 Lee ........................ H04L 5/00
2019/0253986 A1* 8/2019 Jeon ..................... H04L 5/0048

FOREIGN PATENT DOCUMENTS

WO    2013051855 A1    4/2013
WO    2020030974 A2    2/2020

OTHER PUBLICATIONS

Huawei, Hisilicon. Introduction of NR positioning on MAC spec, 3GPP TSG-RAN WG2 Meeting #109 electronic, R2-2002400, Mar. 12, 2020, 9 pages.
Examination Report issued in related Indian Application No. 202227061447, mailed Feb. 15, 2023, 9 pages.
Extended European Search Report issued in related European Application No. 21782027.3, mailed May 26, 2023, 12 pages.
"3rd Generation Partnership Project; Technical Specification Group Radio Access Network; NR; Physical layer procedures for control (Release 16)" 3GPP TS 38.213 V16.1.0, Mar. 2020, 156 pages.
Notice of Reasons for Refusal issued in related Japanese Application No. 2022-560184, mailed Jul. 11, 2023, 6 pages.

* cited by examiner

400

500

| C7 | C6 | C5 | C4 | C3 | C2 | C1 | R |
|----|----|----|----|----|----|----|----|
| P | V | \multicolumn{6}{c|}{PH (Type 2, SpCell of the other MAC entity)} | | | | | | |
| R | R | \multicolumn{6}{c|}{$P_{CMAX,fc}$ 1} | | | | | | |
| P | V | \multicolumn{6}{c|}{PH (Type 1, PCell)} | | | | | | |
| R | R | \multicolumn{6}{c|}{$P_{CMAX,fc}$ 2} | | | | | | |
| P | V | \multicolumn{6}{c|}{PH (Type X, Serving Cell 1)} | | | | | | |
| F | R | \multicolumn{6}{c|}{$P_{CMAX,fc}$ 3} | | | | | | |

...

| | | | | | | | |
|---|---|---|---|---|---|---|---|
| P | V | \multicolumn{6}{c|}{PH (Type X, Serving Cell n)} | | | | | | |
| F | R | \multicolumn{6}{c|}{$P_{CMAX,fc}$ m} | | | | | | |

FIG. 7a

| R | R | PH (Type 1, PCell) |
|---|---|---|
| R | R | $P_{CMAX,fc}$ |

FIG. 7b

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, SpCell of the other MAC entity)} |
| R | R | \multicolumn{6}{c}{$P_{CMAX,f,c}$ 1} |
| P | V | \multicolumn{6}{c}{PH (Type 1, PCell)} |
| R | R | \multicolumn{6}{c}{$P_{CMAX,f,c}$ 2} |
| P | V | \multicolumn{6}{c}{PH (Type X, Serving Cell 1)} |
| R | R | \multicolumn{6}{c}{$P_{CMAX,f,c}$ 3} |

...

| P | V | PH (Type X, Serving Cell n) |
|---|---|---|
| R | R | $P_{CMAX,f,c}$ m |

FIG. 7c

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | \multicolumn{6}{c}{PH (Type 2, SpCell of the other MAC entity)} |
| R | R | \multicolumn{6}{c}{$P_{CMAX,f,c}$ 1} |
| P | V | \multicolumn{6}{c}{PH (Type 1, PCell)} |
| R | R | \multicolumn{6}{c}{$P_{CMAX,f,c}$ 2} |
| P | V | \multicolumn{6}{c}{PH (Type X, Serving Cell 1)} |
| R | R | \multicolumn{6}{c}{$P_{CMAX,f,c}$ 3} |

...

| P | V | PH (Type X, Serving Cell n) |
|---|---|---|
| R | R | $P_{CMAX,f,c}$ m |

FIG. 7d

METHOD FOR TRANSMITTING POWER HEADROOM, TERMINAL DEVICE, AND NETWORK DEVICE

CROSS-REFERENCE TO RELATED APPLICATION

This application is a continuation of International Application No. PCT/CN2021/083219, filed on Mar. 26, 2021, which claims priority to Chinese Patent Application No. 202010246507.0, filed on Mar. 31, 2020. The entire contents of each of the above-identified applications are expressly incorporated herein by reference.

TECHNICAL FIELD

Embodiments of the present disclosure relate to the communications field, and in particular, to a method for transmitting a power headroom, a terminal device, and a network device.

BACKGROUND

A New Radio (NR) supports Carrier Aggregation (CA), Dual Connectivity (DC), Supplementary UpLink (SUL), and carrier switching sending. In these scenarios, User Equipment (UE) may simultaneously send uplink physical channels or reference signals on a plurality of carriers.

A Power Headroom Report (PHR) is mainly used for assisting in scheduling on a network side. According to different channel types, it supports type 1 PHR and type 3 PHR on uplink. Type 1 PHR is calculated based on a Physical Uplink Shared CHannel (PUSCH), and type 3 PHR is calculated based on a Sounding Reference Signal (SRS). SRSs are classified into two types: an SRS used for positioning and an SRS used for measurement. Currently, type 3 PHR does not distinguish between the SRS types. Thus, there is no report for only a first Power Headroom (PH) value corresponding to the SRS used for positioning or for only a second PH value corresponding to the SRS used for measurement.

SUMMARY

According to a first aspect, a method for transmitting a power headroom is provided, where the method is performed by a terminal device, and the method includes: sending a power headroom PH value of a serving cell to a network device, where the PH value is a first PH value of a first sounding reference signal SRS and/or a second PH value of a second SRS; and the first PH value is obtained based on first configuration information of the first SRS, the first SRS is an SRS used for positioning, and the second SRS is an SRS used for measurement.

According to a second aspect, a method for transmitting a power headroom is provided, where the method is performed by a network device, and the method includes: receiving a power headroom PH value of a serving cell sent by a terminal device, where the PH value is a first PH value of a first sounding reference signal SRS and/or a second PH value of a second SRS; and the first PH value is obtained based on first configuration information of the first SRS, the first SRS is an SRS used for positioning, and the second SRS is an SRS used for measurement.

According to a third aspect, a terminal device is provided, where the terminal device includes a processing module, configured to send a power headroom PH value of a serving cell to a network device, where the PH value is a first PH value of a first sounding reference signal SRS and/or a second PH value of a second SRS; and the first PH value is obtained based on first configuration information of the first SRS, the first SRS is an SRS used for positioning, and the second SRS is an SRS used for measurement.

According to a fourth aspect, a network device is provided, where the network device includes an execution module, configured to receive a power headroom PH value of a serving cell sent by a terminal device, where the PH value is a first PH value of a first sounding reference signal SRS and/or a second PH value of a second SRS; and the first PH value is obtained based on first configuration information of the first SRS, the first SRS is an SRS used for positioning, and the second SRS is an SRS used for measurement.

According to a fifth aspect, a terminal device is provided, including a processor, a memory, and a computer program stored in the memory and capable of running on the processor, where the computer program is executed by the processor to implement the steps of the method for transmitting a power headroom according to the first aspect.

According to a sixth aspect, a network device is provided, including a processor, a memory, and a computer program stored in the memory and capable of running on the processor, where the computer program is executed by the processor to implement the steps of the method for transmitting a power headroom according to the second aspect.

According to a seventh aspect, a computer readable storage medium is provided, where the computer readable storage medium stores a computer program, and the computer program is executed by a processor to implement the steps of the method for transmitting a power headroom according to the first aspect or the second aspect.

BRIEF DESCRIPTION OF THE DRAWINGS

Accompanying drawings described herein are used for providing further understanding about this application, and constitute a part of this application. Exemplary embodiments of this application and descriptions thereof are used for explaining this application, and do not constitute an inappropriate limitation on this application. In the accompanying drawings:

FIG. 7a to FIG. 7d are schematic diagrams of a MAC CE signaling format;

DETAILED DESCRIPTION

The technical solutions of this application will be described below with reference to specific embodiments of this application and the accompanying drawings. Apparently, the described embodiments are merely some of the embodiments of this application rather than all of the embodiments. All other embodiments obtained by a person of ordinary skill in the art based on the embodiments of this application shall fall within the protection scope of this application. "And/or" in the embodiments of this specification indicates at least one of the former and the latter.

It should be understood that, the technical solutions in the embodiments of the present disclosure may be applied to various communication systems, such as a Long Term Evolution (LTE) system, an Frequency Division Duplex (FDD) system, an LTE Time Division Duplex (TDD) system, a Universal Mobile Telecommunication System (UMTS), a Worldwide Interoperability for Microwave Access (WiMAX) communication system, and a 5G system, or a New Radio (NR) system, or a subsequent evolution communication system.

In the embodiments of the present disclosure, the terminal device may include, but is not limited to, a Mobile Station (MS), a mobile terminal, a mobile telephone, User Equipment (UE), a handset, portable equipment, a vehicle, or the like. The terminal device may communicate with one or more core networks by using a Radio Access Network (RAN). For example, the terminal device may be a mobile telephone (or referred to as a "cellular" phone) or a computer having a wireless communication function. The terminal device may further be a portable, pocket-sized, handheld, built-in-computer, or in-vehicle mobile apparatus.

In the embodiments of the present disclosure, the network device may be an apparatus deployed in the radio access network and configured to provide a wireless communication function to a terminal device. The network device may be a base station, where the base station may include macro base stations, micro base stations, relay stations, and access points in various forms. In systems using different radio access technologies, names of devices having a function of a base station may be different. For example, the device is referred to as an evolved NodeB (evolved NodeB, eNB or eNodeB for short) in an LTE network, the device is referred to as a Node B in a 3rd Generation (3G) network, or the device is referred to as a network device in a subsequent evolution communication system. However, such terms do not constitute a limitation.

Figure 1:
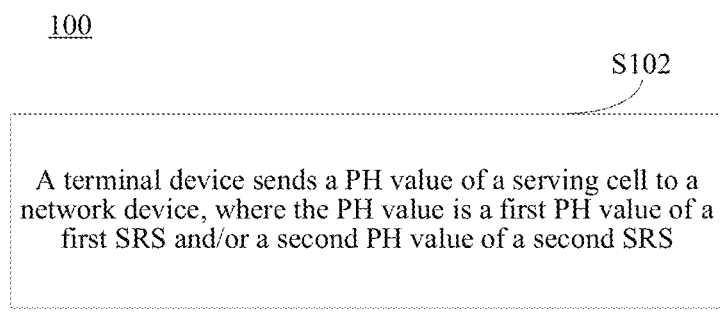
FIG. 1 is a method for transmitting a power headroom according to an embodiment of the present disclosure.

As shown in FIG. 1, an embodiment of the present disclosure provides a method 100 for transmitting a power headroom. The method may be performed by a terminal device. In other words, the method may be performed by software or hardware installed on the terminal device. The method includes the following steps.

S102. The terminal device sends a PH value of a serving cell to a network device, where the PH value is a first PH value of a first SRS and/or a second PH value of a second SRS.

The first PH value is obtained based on first configuration information of the first SRS, the first SRS is an SRS used for positioning, and the second SRS is an SRS used for measurement. In an implementation, the second PH value may be obtained based on second configuration information of the second SRS.

Based on this, the network device may receive the PH value of the serving cell sent by the terminal device, and perform corresponding network scheduling, power scheduling, or terminal scheduling based on the PH value.

Therefore, an embodiment of the present disclosure provides a method 100 for transmitting a power headroom. A PH value of a serving cell is sent to a network device, and the PH value is a first PH value of a first SRS and/or a second PH value of a second SRS. The first PH value is obtained based on first configuration information of the first SRS, the first SRS is an SRS used for positioning, and the second SRS is an SRS used for measurement. PH value reporting can be performed for the first PH value corresponding to the SRS used for positioning or the second PH value corresponding to the SRS used for measurement, so that the network device can perform corresponding network scheduling, power scheduling, or terminal scheduling for the first PH value or the second PH value.

Figure 2:
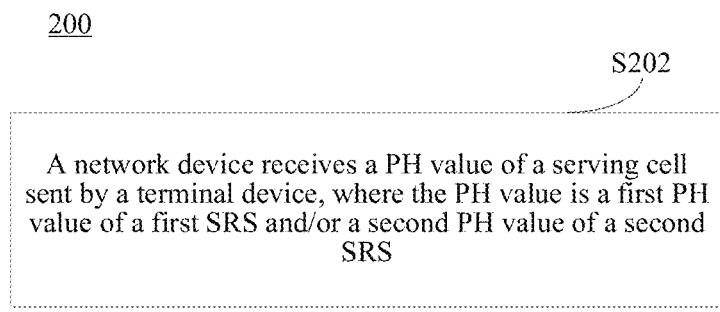
FIG. 2 is a method for transmitting a power headroom according to another embodiment of the present disclosure.

As shown in FIG. 2, an embodiment of the present disclosure provides a method 200 for transmitting a power headroom. The method may be performed by a network device. In other words, the method may be performed by software or hardware installed on the network device. The method includes the following steps.

S202. The network device receives a PH value of a serving cell sent by a terminal device, where the PH value is a first PH value of a first SRS and/or a second PH value of a second SRS.

The first PH value is obtained based on first configuration information of the first SRS, the first SRS is an SRS used for positioning, and the second SRS is an SRS used for measurement.

In an implementation, the network device may receive a PH value by using a Medium Access Control Control Element (MAC CE), and perform corresponding network scheduling, power scheduling, or terminal scheduling based on the PH value.

Therefore, an embodiment of the present disclosure provides a method 200 for transmitting a power headroom. A PH value of a serving cell sent by a terminal device is received, where the PH value is a first PH value of a first SRS and/or a second PH value of a second SRS. The first SRS is an SRS used for positioning, and the second SRS is an SRS used for measurement. Corresponding network scheduling, power scheduling, or terminal scheduling can be performed on the first PH value corresponding to the SRS used for positioning or the second PH value corresponding to the SRS used for measurement.

Figure 3:
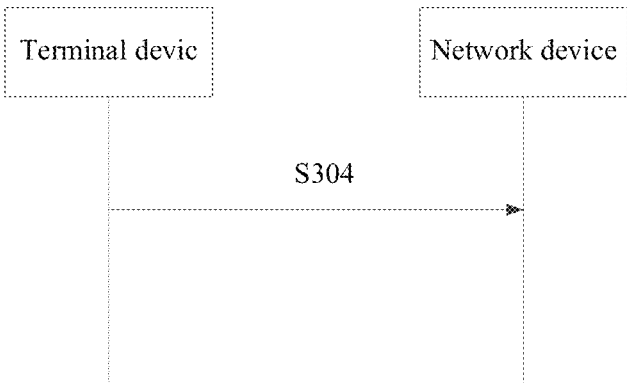
FIG. 3 is a method for transmitting a power headroom according to still another embodiment of the present disclosure.

As shown in FIG. 3, an embodiment of the present disclosure provides a method 300 for transmitting a power headroom. The method may be performed by a terminal device and/or a network device. In other words, the method may be performed by software or hardware installed on the terminal device and/or the network device. The method includes the following steps.

S304. The terminal device sends a PH value of a serving cell to the network device, where the PH value is a first PH value of a first SRS and/or a second PH value of a second SRS.

The first PH value is obtained based on first configuration information of the first SRS, the first SRS is an SRS used for positioning, and the second SRS is an SRS used for measurement. In an implementation, the second PH value may be obtained based on second configuration information of the second SRS.

In an implementation, the first configuration information of the SRS used for positioning may be configured in an information element of an SRS resource set used for positioning, for example, may be configured in an information element of SRS-PosResourceset. The second configuration information may be configured in SRS-Resourceset.

In an implementation, the terminal device may send the PH value to the network device by using a MAC CE.

In an implementation, a UE may trigger PHR reporting according to a trigger condition specified in a protocol.

The network device receives the PH value of the serving cell sent by the terminal device, where the PH value is the first PH value of the first SRS and/or the second PH value of the second SRS.

The first PH value is obtained based on the first configuration information of the first SRS, the first SRS is an SRS used for positioning, and the second SRS is an SRS used for measurement.

In an implementation, the network device may receive the PH value by using a MAC CE, and perform corresponding network scheduling, power scheduling, or terminal scheduling based on the PH value.

Therefore, an embodiment of the present disclosure provides a method 300 for transmitting a power headroom. A power headroom PH value of a serving cell is sent to a network device, and the PH value is a first PH value of a first sounding reference signal SRS and/or a second PH value of a second SRS. The first PH value is obtained based on first configuration information of the first SRS, the first SRS is an SRS used for positioning, and the second SRS is an SRS used for measurement. PH value reporting can be performed for the first PH value corresponding to the SRS used for positioning or the second PH value corresponding to the SRS used for measurement, so that the network device can perform corresponding network scheduling, power scheduling, or terminal scheduling for the first PH value or the second PH value.

Figure 4:
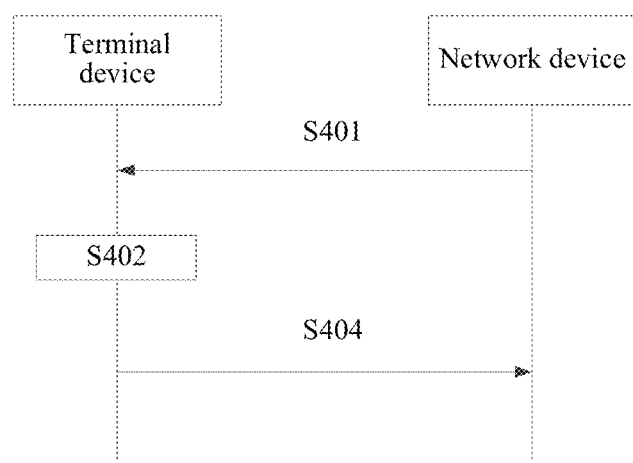
FIG. 4 is a method for transmitting a power headroom according to yet another embodiment of the present disclosure.

As shown in FIG. 4, an embodiment of the present disclosure provides a method 400 for transmitting a power headroom. The method may be performed by a terminal device and/or a network device. In other words, the method may be performed by software or hardware installed on the terminal device and/or the network device. The method includes the following steps.

S401. The network device sends first configuration information of a first SRS to the terminal device.

The first configuration information includes a path loss reference (Path loss reference) signal $PL_{b,f,c}(q_d)$ a p0 power value $P_{O\_SRS,b,f,c}(q_s)$, and a path loss coefficient $\alpha_{SRS,b,f}(q_s)$ where the path loss reference signal is a signal transmitted by a target cell, and the target cell is a serving cell and/or a neighboring cell.

In an implementation, the path loss reference signal includes at least one of a Synchronization Signal and PBCH Block (SSB), a Channel State Information (CSI) reference signal, or a Downlink Pos-Reference Signal (Dl-PRS).

When the path loss reference signal is an SSB or a CSI reference signal, the first configuration information further includes transmit power information of the path loss reference signal. The transmit power information is used to indicate a transmit power of the path loss reference signal. When the path loss reference signal is a DL PRS, the transmit power information of the path loss reference signal is specified by an LTE Positioning Protocol (LPP). The terminal device receives the first configuration information, and performs the following steps.

S402. The terminal device obtains a first PH value of the first SRS based on the first configuration information of the first SRS.

In some embodiments, the obtaining a first PH value of the first SRS based on the first configuration information of the first SRS may include the following step:

calculating a path loss value $PL_{b,f,c}(q_d)$ based on a transmit power of a path loss reference signal and a receive power obtained by measuring the path loss reference signal. In an implementation, the path loss value $PL_{b,f,c}(q_d)$ is a difference between the transmit power and the receive power of the path loss reference signal.

For a path loss reference in a 5G NR system, a network side may configure a plurality of downlink path loss references for one cell at the same time. In some embodiments, each path loss reference may correspond to different reference signals, for example, path_loss_reference_1 corresponds to SSB1; path_loss_reference_2 corresponds to SSB2. For uplink sending of the UE, the network side may indicate, by using a MAC CE or a Physical Downlink Control CHannel (PDCCH), to change a path loss reference currently used by the UE.)

The first PH value is obtained based on the path loss value $PL_{b,f,c}(q_d)$, a p0 power value $P_{O\_SRS,b,f,c}(q_s)$, a path loss coefficient $\alpha_{SRS,b,f,c}(q_s)$, and a maximum transmit power $\tilde{P}_{CMAX,f,c}(i)$ of the serving cell. The maximum transmit power $\tilde{P}_{CMAX,f,c}(i)$ of the serving cell is a maximum output power configured by the UE for a carrier f of a serving cell c in an SRS transmission opportunity i, which may be specified in a protocol.

In an implementation, the first PH value=$f(\tilde{P}_{CMAX,f,c}(i), P_{O\_SRS,b,f,c}(q_s) \alpha_{SRS,b,f,c}(q_s), PL_{b,f,c}(q_d))$.

In another implementation, the first PH value= $f(\tilde{P}_{CMAX,f,c}(i), PL_{O\_SRS,b,f,c}(q_s)), \alpha_{SRS,b,f,c}(q_s), PL_{b,f,c}(q_d), h_{b,f,c}(i))$, where a power control adjustment value $h_{b,f,c}(i)$ may be 0, that is, the first PH value is independent of the power control adjustment value $h_{b,f,c}(i)$.

S404. The terminal device sends a PH value of a serving cell to the network device, where the PH value is a first PH value of a first SRS and/or a second PH value of a second SRS.

The network device receives the PH value of the serving cell sent by the terminal device, where the PH value is the first PH value of the first SRS and/or the second PH value of the second SRS, and the first SRS is an SRS used for positioning.

S404 may be described in a similar manner to step S304 in the embodiment shown in FIG. 3, and repeated parts are not described herein again.

Therefore, an embodiment of the present disclosure provides a method 200 for transmitting a power headroom. A path loss value is calculated based on a transmit power of a path loss reference signal and a receive power obtained by measuring the path loss reference signal, and a first PH value is obtained based on the path loss value, a p0 power value, a path loss coefficient, and a maximum transmit power of a serving cell. A first PH value corresponding to an SRS used for positioning can be accurately determined and reported, so that a network device can perform corresponding network scheduling, power scheduling, or terminal scheduling for the first PH value.

Figure 5:
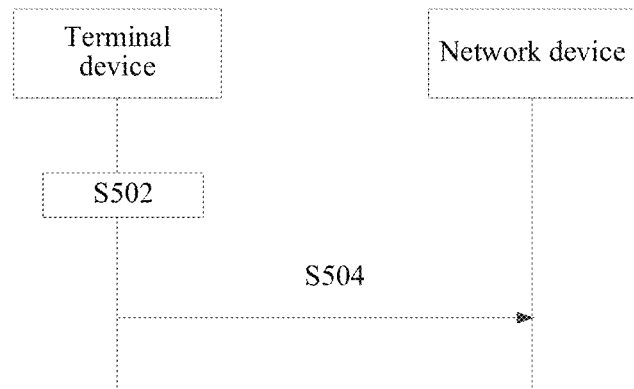
FIG. 5 is a method for transmitting a power headroom according to yet another embodiment of the present disclosure.

As shown in FIG. 5, an embodiment of the present disclosure provides a method 500 for transmitting a power headroom. The method may be performed by a terminal device and/or a network device. In other words, the method may be performed by software or hardware installed on the terminal device and/or the network device. The method includes the following steps.

S502. The terminal device obtains a first PH value of the first SRS based on the first configuration information of the first SRS.

This step may be described in a similar manner to step S402 in the embodiment shown in FIG. 4, and repeated parts are not described herein again.

In an implementation, the first configuration information includes a path loss reference signal, a p0 power value $P_{O\_SRS,b,f,c}(q_s)$, and a path loss coefficient $\alpha_{SRS,b,f,c}(q_s)$, where the path loss reference signal is a signal transmitted by a target cell, and the target cell is a serving cell or/and a neighboring cell.

In an implementation, the path loss reference signal includes: at least one of an SSB, a CSI reference signal, or a Dl-PRS.

When the path loss reference signal is an SSB or a CSI reference signal, the first configuration information further includes transmit power information of the path loss reference signal. When the path loss reference signal is a DL PRS, the transmit power information of the path loss reference signal is specified by an LTE Positioning Protocol (LPP).

In some embodiments, the obtaining a first PH value based on the first configuration information of the SRS used for positioning includes the following step:

calculating a path loss value $PL_{b,f,c}(q_d)$ based on a transmit power of a path loss reference signal and a receive power obtained by measuring the path loss reference signal. In an) implementation, the path loss value $PL_{b,f,c}(q_d)$ is a difference between the transmit power and the receive power of the path loss reference signal.

For a path loss reference in a 5G NR system, a network side may configure a plurality of downlink path loss references for one cell at the same time. In some embodiments, each path loss reference may correspond to different reference signals, for example, path_loss_reference_1 corresponds to SSB1; path_loss_reference_2 corresponds to SSB2. For uplink sending of a UE, a network side may indicate, by using a MAC CE or a PDCCH, to change a path loss reference currently used by the UE.

For the SRS used for positioning and the SRS used for measurement, calculation methods for a power and path loss thereof are different. For the SRS used for measurement, its power is calculated according to the following formula:

$$P_{SRS,b,f,c}(i, q_s, l) = \min\left\{\begin{array}{l}P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l)\end{array}\right\}$$

where $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, $PL_{b,f,c}(q_d)$ is the path loss value, and $10\log_{10}(2^\mu \cdot M_{SRS,b,f,c}(i))$ is a function with a bandwidth and a subcarrier as variables. The above parameters are configured by parameters of srs-resourceset.

For the SRS used for positioning, its power is calculated according to the following formula:

$$P_{SRS,b,f,c}(i, q_s) = \min\left\{\begin{array}{l}P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d)\end{array}\right\}$$

where $\tilde{P}_{CMAX,f,c}(i)$ is the maximum transmit power of the serving cell, $\tilde{P}_{O\_SRS,b,f,c}(q_s)$ is the p0 power value, $\alpha_{SRS,b,f,c}(q_s)$ is the path loss coefficient, $PL_{b,f,c}(q_d)$ is the path loss value, and $10\log_{10}(2^\mu \cdot M_{SRS,b,f,c}(i))$ is a function with a bandwidth and a subcarrier as variables. The above parameters are configured by parameters of srs-posresourceset.

The first PH value is obtained based on the path loss value $PL_{b,f,c}(q_d)$, a p0 power value $P_{O\_SRS,b,f,c}(q_s)$, a path loss coefficient $\alpha_{SRS,b,f,c}(q_s)$, and a maximum transmit power $\tilde{P}_{CMAX,f,c}(i)$ of the serving cell. The maximum transmit power $\tilde{P}_{CMAX,f,c}(i)$ of the serving cell is a maximum output power configured by the UE for a carrier f of a serving cell c in an SRS transmission opportunity i, and the maximum transmit power of the serving cell may be specified in a protocol.

In an implementation, the first PH value=$f(\tilde{P}_{CMAX,f,c}(i)$, $P_{O\_SRS,b,f,c}(q_s)$, $\alpha_{SRS,b,f,c}(q_s)$, $PL_{b,f,c}(q_d)$). In another implementation, the first PH value=$f(\tilde{P}_{CMAX,f,c}(i)$, $P_{O\_SRS,b,f,c}(q_s)$, $\alpha_{SRS,b,f,c}(q_s)$, $PL_{b,f,c}(q_d)$, $h_{b,f,c}(i))$, where a power control adjustment value $h_{b,f,c}(i)$ may be 0.

According to whether the uplink physical channel or the reference signal is actually transmitted, uplink supports virtual and real PHRs. The virtual PHR corresponds to that the uplink physical channel or the reference signal is not transmitted, and the real PHR corresponds to that the uplink physical channel or the reference signal is actually transmitted. Based on this, in an implementation, when the first PH value is transmitted based on a referenced SRS for positioning, the first PH value is obtained according to the following formula (1):

$$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d)\} \quad (1)$$

where $PH_{type3,b,f,c}(i, q_s)$ is the first PH value, $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, and $PL_{b,f,c}(q_d)$ is the path loss value.

In some embodiments, when the first PH value is transmitted based on a referenced SRS for positioning, the first PH value is obtained according to the following formula (2):

$$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\} \quad (2)$$

where $PH_{type3,b,f,c}(i, q_s)$ is the first PH value, $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, $PL_{b,f,c}(q_d)$ is the path loss value, $h_{b,f,c}(i)$ is a power control adjustment value, and $h_{b,f,c}(i)$ is 0.

In another implementation, when the first PH value is transmitted based on an SRS actually for positioning, the first PH value may be obtained according to the following formula (3):

$$PH_{type3,b,f,c}(i,q_s) = P_{CMAX,f,c}(i) - \{P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d)\} \quad (3)$$

where $PH_{type3,b,f}(q_s)$ is the first PH value, $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, $PL_{b,f,c}(q_d)$ is the path loss value, and $10\log_{10}(2^\mu \cdot M_{SRS,b,f,c}(i))$ is a function with a bandwidth and a subcarrier as variables.

S504. The terminal device sends a PH value of a serving cell to the network device, where the PH value is a first PH value of a first SRS and/or a second PH value of a second SRS.

The network device receives the first PH value of the SRS that is used for positioning and sent by the terminal device.

S504 may be described in a similar manner to step S304 in the embodiment shown in FIG. 3, and repeated parts are not described herein again.

Therefore, an embodiment of the present disclosure provides a method 500 for transmitting a power headroom. A path loss value is calculated based on a transmit power of a path loss reference signal and a receive power obtained by measuring the path loss reference signal, and a first PH value is obtained based on the path loss value, a p0 power value, a path loss coefficient, and maximum transmit power of a serving cell. A PH value corresponding to an SRS used for positioning can be accurately determined and reported, so that a network device can perform corresponding network scheduling, power scheduling, or terminal scheduling for the PH value of the SRS used for positioning.

Figure 6:
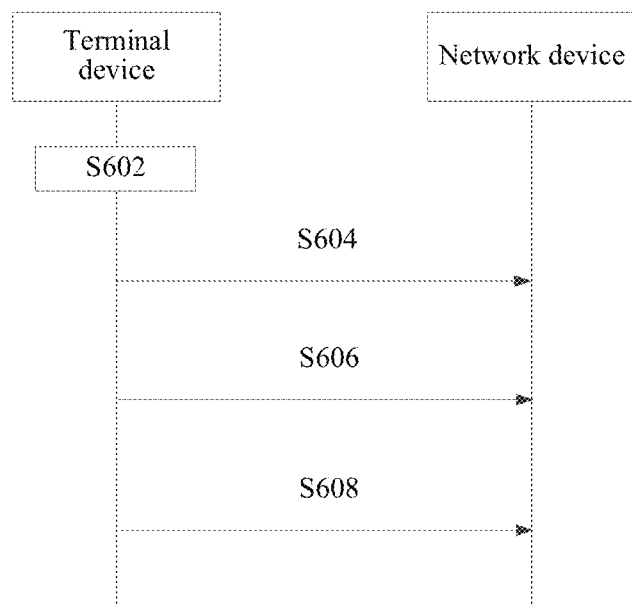
FIG. 6 is a method for transmitting a power headroom according to yet another embodiment of the present disclosure.

As shown in FIG. 6, an embodiment of the present disclosure provides a method 600 for transmitting a power headroom. The method may be performed by a terminal device and/or a network device. In other words, the method may be performed by software or hardware installed on the terminal device and/or the network device. The method includes the following steps.

S602. The terminal device obtains a first PH value of the first SRS based on the first configuration information of the first SRS.

This step may be similarly described as step S402 in the embodiment shown in FIG. 4 or step S502 in the embodiment shown in FIG. 5. Repeated parts are not described herein again.

S604. The terminal device sends a PH value of a serving cell to the network device, where the PH value is a first PH value of a first SRS and/or a second PH value of a second SRS.

The network device receives the first power headroom PH value of the SRS that is used for positioning and sent by the terminal device.

S604 may be described in a similar manner to step S304 in the embodiment shown in FIG. 3, and repeated parts are not described herein again.

S606. The terminal device sends indication information to the network device, where the indication information is used to indicate that the PH value is the first PH value or the second PH value.

In an implementation, the indication information may be sent independently, or may be sent together with other information. For example, if the indication information is sent together with other information, it is assumed that the indication information is sent together with the PH value. In step S604, the PH value may be sent to the network device by using a MAC CE, and the MAC CE further includes a bit used to indicate that the PH value is the first PH value or the second PH value, as shown in bit F in FIG. 7a. The bit may use a reserved bit R in the MAC CE, may use a bit V used to indicate whether the PH value is based on actual transmission or a reference format, or may use a bit P used to indicate whether power backoff is applied to MAC based on power management, or may use a joint indication, a bit of a combined PH value, or a bit of an extended PH value to indicate that the PH value is the first PH value or the second PH value.

The network device receives the indication information sent by the terminal device, where the indication information is used to indicate that the PH value is the first PH value or the second PH value.

Therefore, the network device may determine whether the received PH value is the first PH value or the second PH value, and perform corresponding network scheduling, power scheduling, or terminal scheduling.

It should be noted that FIG. 6 is schematically described in a way that step S606 is after step S604. However, in actual application, step S606 may be performed before, after, or at the same time as step S604. Therefore, a schematic description of step S606 being after step S604 in FIG. 6 is not construed as a limitation on an implementation of the present disclosure.

S608. The terminal device sends related information to the network device.

In some embodiments, PHRs are divided into a single PHR and a multiple PHR. The former PHR includes only a PH of a Primary cell (PCell), and the latter PHR includes a Pcell and a Secondary Cell (SCell). A single entry PHR MAC CE and a multiple entry PHR MAC CE are used when the PHR is reported. For example, when the single entry PHR MAC CE is used, in this step, UE may further report, to the network device, related information used to indicate a maximum transmit power $\tilde{P}_{CMAX,f,c}(i)$ of the serving cell, for example, as shown in FIG. 7b.

For another example, when the multiple entry PHR MAC CE is used, the UE may further report the following related information to the network device.

The related information is used to indicate at least one of the following: whether a PH field of a target cell index exists, the first PH value is transmitted based on an SRS actually for positioning, the first PH value is transmitted based on a referenced SRS for positioning, a maximum transmit power $\tilde{P}_{CMAX,f,c}$ of the serving cell, and whether power backoff is applied to medium access control MAC based on power management, for example, as shown in FIG. 7c or FIG. 7d.

Correspondingly, this embodiment further includes: The network device receives the related information sent by the terminal device. Interaction between the network device and the terminal device described from the network device side is the same as that described on the terminal device side in S608. To avoid repetition, related descriptions are appropriately omitted.

It should also be noted that FIG. 6 is schematically described in a way that step S608 is after step S604 and S606. However, in actual application, step S608 may be performed before, after, or at the same time as step S604 and/or S606. Therefore, a schematic description of step S608 being after step S604 and/or S606 in FIG. 6 is not construed as a limitation on an implementation of the present disclosure.

In addition, in some embodiments, the method for transmitting a power headroom includes steps S602, S604, and S606. Other embodiments include steps S602, S604, and S608.

Therefore, an embodiment of the present disclosure provides a method 600 for transmitting a power headroom. By sending indication information to a network device, where the indication information is used to indicate that a PH value is a first PH value or a second PH value, it can be determined that the transmitted PH value is the first PH value or the second PH value.

It may be understood that interaction between the network device and the terminal device described from the network device side is the same as that described on the terminal device side. To avoid repetition, related descriptions are appropriately omitted.

Figure 8:
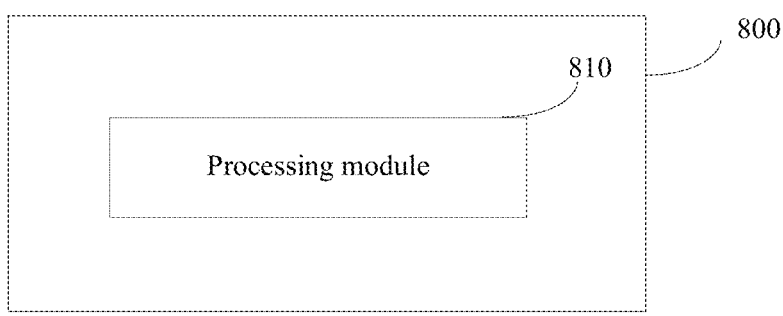
FIG. 8 is a schematic structural diagram of a terminal device according to an embodiment of the present disclosure.

FIG. 8 is a schematic structural diagram of a terminal device according to an embodiment of the present disclosure. As shown in FIG. 8, the terminal device 800 includes a processing module 810.

The processing module 810 is configured to send a power headroom PH value of a serving cell to a network device, where the PH value is a first PH value of a first sounding reference signal SRS and/or a second PH value of a second SRS; and the first PH value is obtained based on first configuration information of the first SRS, the first SRS is an SRS used for positioning, and the second SRS is an SRS used for measurement.

In an implementation, the processing module 810 is configured to send indication information to the network device, where the indication information is used to indicate that the PH value is the first PH value or the second PH value.

In an implementation, the processing module 810 is configured to send the PH value to the network device by using a MAC CE.

In an implementation, the MAC CE further includes a bit used to indicate that the PH value is the first PH value or the second PH value.

In an implementation, the first configuration information is configured in an information element of an SRS resource set used for positioning.

In an implementation, the processing module 810 is configured to calculate a path loss value based on a transmit power of a path loss reference signal and a receive power obtained by measuring the path loss reference signal; and obtain the first PH value based on the path loss value, a p0 power value, a path loss coefficient, and a maximum transmit power of the serving cell; and the first configuration information includes the path loss reference signal, the p0 power value, and the path loss coefficient.

In an implementation, the processing module 810 is configured to obtain the first PH value based on the path loss value, the p0 power value, the path loss coefficient, the maximum transmit power of the serving cell, and a power control adjustment value, where the power control adjustment value is 0.

In an implementation, the processing module 810 is configured to: when the first PH value is transmitted based on a referenced SRS for positioning, obtain the first PH value according to the following formula:

$$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d)\}$$

where $PH_{type3,b,f,c}(i, q_s)$ is the first PH value, $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, and $PL_{b,f,c}(q_d)$ is the path loss value.

In an implementation, the processing module 810 is configured to: when the first PH value is transmitted based on an SRS actually for positioning, obtain the first PH value according to the following formula:

$$PH_{type3,b,f,c}(i,q_s) = P_{CMAX,f,c}(i) - \{P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d)\}$$

where $PH_{type3,b,f,c}(i, q_s)$ is the first PH value, $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, $PL_{b,f,c}(q_d)$ is the path loss value, and $10\log_{10}(2^\mu \cdot M_{SRS,b,f,c}(i))$ is a function with a bandwidth and a subcarrier as variables.

In an implementation, the path loss reference signal includes at least one of a synchronization signal block SSB, a channel state information CSI reference signal, or a downlink positioning reference signal DL-PRS.

In an implementation, when the path loss reference signal is an SSB or a CSI reference signal, the first configuration information further includes transmit power information of the path loss reference signal; and when the path loss reference signal is a DL PRS, the transmit power information of the path loss reference signal is specified by a predetermined protocol.

In an implementation, the processing module 810 is configured to send, to the network device, related information that is used to indicate at least one of the following: whether a PH field of a target cell index exists, the first PH value is transmitted based on an SRS actually for positioning, the first PH value is transmitted based on a referenced SRS for positioning, a maximum transmit power of the serving cell, and whether power backoff is applied to medium access control MAC based on power management.

The terminal device 800 according to this embodiment of the present disclosure may refer to procedures executed by the terminal device in the methods 100 and 300-700 corresponding to the embodiments of the present disclosure. In addition, units/modules and other operations and/or functions of the terminal device 800 are separately intended to implement procedures executed by the terminal device in the methods 100 and 300-700, and a same or equivalent technical effect can be achieved. For brevity, details are not described herein again.

Figure 9:
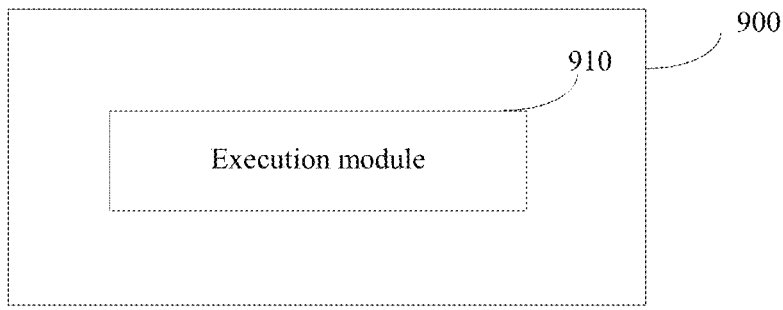
FIG. 9 is a schematic structural diagram of a network device according to an embodiment of the present disclosure.

FIG. 9 is a schematic structural diagram of a network device according to an embodiment of the present disclosure. As shown in FIG. 9, the network device 900 includes an execution module 910.

The execution module 910 is configured to receive a power headroom PH value of a serving cell sent by a terminal device, where the PH value is a first PH value of a first sounding reference signal SRS and/or a second PH value of a second SRS; and the first SRS is an SRS used for positioning, and the second SRS is an SRS used for measurement.

In an implementation, the execution module 910 is configured to receive indication information sent by the terminal device, where the indication information is used to indicate that the PH value is the first PH value or the second PH value.

In an implementation, the execution module 910 is configured to receive, by using a MAC CE, the PH value sent by the terminal device.

In an implementation, the MAC CE further includes a bit used to indicate that the PH value is the first PH value or the second PH value.

In an implementation, the first configuration information is configured in an information element of an SRS resource set used for positioning.

In an implementation, the path loss reference signal includes at least one of a synchronization signal block SSB, a channel state information CSI reference signal, or a downlink positioning reference signal DL-PRS.

In an implementation, when the path loss reference signal is an SSB or a CSI reference signal, the first configuration information further includes transmit power information of the path loss reference signal.

In an implementation, the execution module 910 is configured to receive indication information sent by the terminal device, where the indication information is used to indicate that the PH value is the first PH value or the second PH value of an SRS used for measurement.

In an implementation, the execution module 910 is configured to receive related information that is sent by the terminal device and that is used to indicate at least one of the following: whether a PH field of a target cell index exists, the first PH value is transmitted based on an SRS actually for positioning, the first PH value is transmitted based on a referenced SRS for positioning, a maximum transmit power of the serving cell, and whether power backoff is applied to medium access control MAC based on power management.

The network device 900 according to this embodiment of the present disclosure may refer to procedures executed by the network device in the methods 200 and 300-700 corresponding to the embodiments of the present disclosure. In addition, units/modules and other operations and/or functions of the network device 900 are separately intended to implement procedures executed by the network device in the methods 200 and 300-700, and a same or equivalent technical effect can be achieved. For brevity, details are not described herein again.

Figure 10:
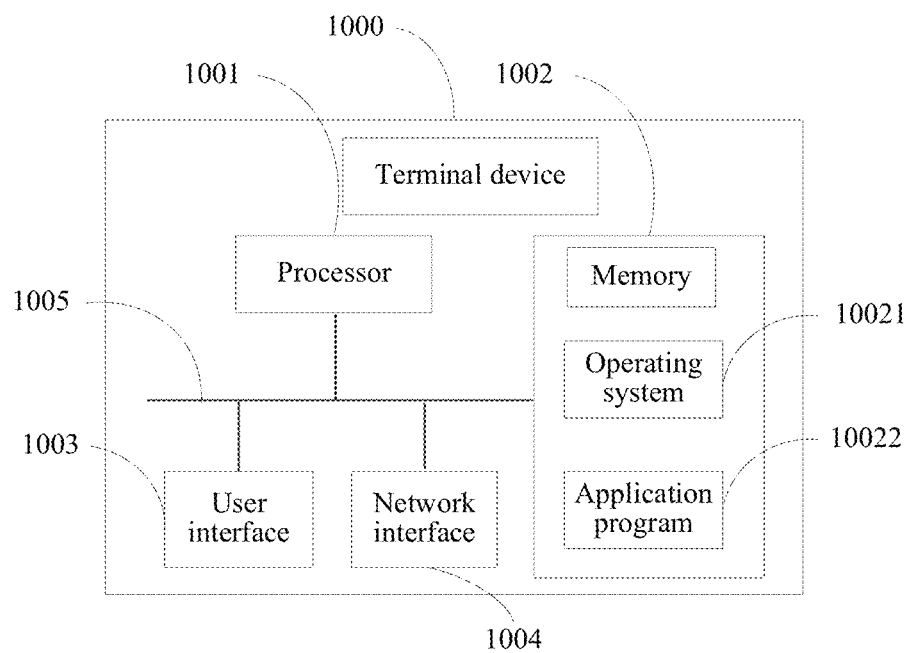
FIG. 10 is a schematic structural diagram of a terminal device according to another embodiment of the present disclosure.

FIG. 10 is a block diagram of a terminal device according to another embodiment of the present disclosure. A terminal device 1000 shown in FIG. 10 includes at least one processor 1001, a memory 1002, at least one network interface 1004, and a user interface 1003. All components in the terminal device 1000 are coupled together by a bus system 1005. It may be understood that the bus system 1005 is configured to implement connection and communication between the components. In addition to a data bus, the bus system 1005 further includes a power bus, a control bus, and a status signal bus. However, for ease of clear description, all types of buses are marked as the bus system 1005 in FIG. 10.

The user interface 1003 may include a display, a keyboard, a click/tap device (such as a mouse, or a trackball), a touch panel, or a touchscreen.

It may be understood that, the memory 1002 in the embodiments of the present disclosure may be a volatile memory or a non-volatile memory, or may include both a volatile memory and a non-volatile memory. The non-volatile memory may be a Read-Only Memory (ROM), a Programmable ROM (PROM), an Erasable Programmable Read-Only Memory (EPROM), an Electrically EPROM (EEPROM), or a flash memory. The volatile memory may be a Random Access Memory (RAM), used as an external cache. Through exemplary but not limitative description, many forms of RAMs may be used, for example, a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchlink Dynamic Random Access Memory (SLDRAM), and a Direct Rambus Random Access Memory (DRRAM). The memory 1002 in the system and method described in the embodiments of the present disclosure is intended to include, but is not limited to, the memories and any other memory of a suitable type.

In some implementations, the memory 1002 stores the following elements: an executable module or a data structure, or a subset thereof, or an extension set thereof: an operating system 10021 and an application program 10022.

The operating system 10021 includes various system programs, for example, a framework layer, a core library layer, a driver layer, and the like, which are used for implementing various basic services and processing a task based on hardware. The application program 10022 may include various application programs such as a media player, a browser, and the like, used for implementing various application services. A program for implementing the method in the embodiments of the present disclosure may be included in the application program 10022.

In this embodiment of the present disclosure, the network device 1000 further includes: a computer program stored on the memory 1002 and executable by the processor 1001, when executed by the processor 1001, the computer program implementing the procedures executed by the terminal device in the methods 100 and 300-700.

The method disclosed in the embodiments of the present disclosure may be applied to the processor 1001 or implemented by the processor 1001. The processor 1001 may be an integrated circuit chip having a capability of processing a signal. In an implementation process, steps in the foregoing methods can be implemented by using a hardware integrated logical circuit in the processor 1001, or by using instructions in a form of software. The foregoing processor 1001 may be a general-purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component, and may implement or perform the methods, the steps, and logic block diagrams that are disclosed in the embodiments of the present disclosure. The general-purpose processor may be a microprocessor, or the processor may be any conventional processor or the like. The steps of the methods disclosed with reference to the embodiments of the present disclosure may be directly performed and completed by using a hardware decoding processor, or may be performed and completed by using a combination of hardware and software modules in the decoding processor. The software module may be stored in a computer-readable storage medium that is mature in the art, such as a RAM, a flash memory, a ROM, a programmable ROM, an electrically erasable programmable memory, or a register. The computer-readable storage medium is located in the memory 1002, and the processor 1001 reads information in the memory 1002, and completes the steps in the foregoing methods in combination with hardware thereof. In some embodiments, the computer-readable storage medium stores a computer program. The computer program, when executed by the processor 1001, causes the processor to perform the procedures executed by the terminal device in the methods 100 and 300-700.

It may be understood that, the embodiments described in the embodiments of the present disclosure may be implemented by using software, hardware, firmware, middleware, microcode, or a combination thereof. For hardware implementation, the processing unit may be implemented by one or more Application Specific Integrated Circuits (ASIC), Digital Signal Processor (DSP), DSP Device (DSPD), Programmable Logic Devices (PLDs), Field-Programmable Gate Array (FPGA), general-purpose processors, controllers, microcontrollers, microprocessors, other electronic components configured to implement the functions of this application, or a combination thereof.

For software implementation, the technology described in the embodiments of the present disclosure may be implemented by using modules (for example, processes and functions) implementing the functions of the embodiments of the present disclosure. Software code may be stored in a memory and executed by a processor. The memory may be implemented inside or outside the processor.

The terminal device 1000 can implement the processes implemented by the terminal device in the foregoing embodiments and can achieve the same or equivalent technical effects. To avoid repetition, details are not described herein again.

Figure 11:
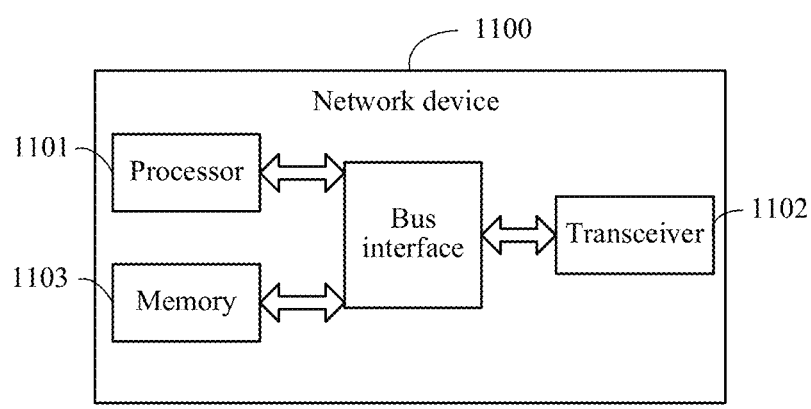
FIG. 11 is a schematic structural diagram of a network device according to another embodiment of the present disclosure.

Referring to FIG. 11, FIG. 11 is a schematic structural diagram of a network device applied to an embodiment of the present disclosure, which can implement details of the method embodiment 400, and can achieve the same technical effects. As shown in FIG. 11, a network device 1100 includes: a processor 1101, a transceiver 1102, a memory 1103, and a bus interface. In this embodiment of the present disclosure, the network device 1100 further includes: a computer program stored on the memory 1103 and executable by the processor 1101, when executed by the processor 1101, the computer program implementing the following steps corresponding to the network device in the methods 200 and 300-700.

In FIG. 11, a bus architecture may include any quantity of interconnected buses and bridges, and specifically connects with circuits that are of one or more processors represented by the processor 1101 and of a memory represented by the memory 1103. The bus architecture may further connect various other circuits such as a peripheral device, a voltage stabilizer, and a power management circuit. These are known in the art, and therefore are not further described in this specification. The bus interface provides an interface. The transceiver 1102 may be a plurality of elements, that is, including a transmitter and a receiver, providing a unit configured to communicate with various other apparatuses on a transmission medium.

The processor 1101 is responsible for the management of the bus architecture and normal processing, and the memory 1103 may be configured to store data used when the processor 1101 performs an operation.

An embodiment of the present disclosure further provides a computer-readable storage medium, storing a computer program, where the computer program, when executed by a processor, implements processes executed by the network device in the foregoing method embodiments 200 and 300-700, and the same technical effect can be achieved. To avoid repetition, details are not repeated herein. The computer-readable storage medium is, for example, a Read-Only Memory (ROM for short), a Random Access Memory (RAM for short), a magnetic disk, or an optical disc.

It is to be noted that, the terms "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

The invention claimed is:

1. A method for transmitting a power headroom, performed by a terminal device, the method comprising:
   sending a Power Headroom (PH) value of a serving cell to a network device, wherein the PH value is a first PH value of a first Sounding Reference Signal (SRS) or a second PH value of a second SRS,
   wherein the first PH value is obtained based on first configuration information of the first SRS, the first SRS is an SRS used for positioning, and the second SRS is an SRS used for measurement, and
   wherein before sending the PH value of the serving cell to the network device, the method further comprises:
      calculating a path loss value based on a transmit power of a path loss reference signal and a receive power obtained by measuring the path loss reference signal; and
      obtaining the first PH value based on the path loss value, a p0 power value, a path loss coefficient, and a maximum transmit power of the serving cell,
   wherein the first configuration information comprises the path loss reference signal, the p0 power value, and the path loss coefficient, and
   wherein the path loss reference signal is a signal transmitted by a target cell, and the target cell comprises at least one of the serving cell or a neighboring cell.

2. The method according to claim 1, further comprising:
   sending indication information to the network device, wherein the indication information is used to indicate that the PH value is the first PH value or the second PH value.

3. The method according to claim 1, wherein the sending a PH value of a serving cell to a network device comprises:
   sending the PH value to the network device by using a Medium Access Control Control Element (MAC CE).

4. The method according to claim 3, wherein the MAC CE further comprises a bit used to indicate that the PH value is the first PH value or the second PH value.

5. The method according to claim 1, wherein the first configuration information is configured in an information element of an SRS resource set used for positioning.

6. The method according to claim 1, wherein the obtaining the first PH value based on the path loss value, a p0 power value, a path loss coefficient, and a maximum transmit power of the serving cell comprises:
   obtaining the first PH value based on the path loss value, the p0 power value, the path loss coefficient, the maximum transmit power of the serving cell, and a power control adjustment value, wherein the power control adjustment value is 0.

7. The method according to claim 1,
wherein the obtaining the first power headroom PH value based on the path loss value, a p0 power value, a path loss coefficient, and a maximum transmit power of the serving cell comprises:
when the first PH value is transmitted based on a referenced SRS for positioning, obtaining the first PH value according to the following formula:

$$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d)\}$$

wherein $PH_{type3,b,f,c}(i, q_s)$ is the first PH value, $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, and $PL_{b,f,c}(q_d)$ is the path loss value; or
wherein the obtaining the first PH value based on the path loss value, a p0 power value, a path loss coefficient, and a maximum transmit power of the serving cell comprises:
when the first PH value is transmitted based on an SRS actually for positioning, obtaining the first PH value according to the following formula:

$$PH_{type3,b,f,c}(i,q_s) = P_{CMAX,f,c}(i) - \{P_{O\_SRS,b,f,c}(q_s) + 10 \log_{10}(2^\mu \cdot M_{SRS,b,f,c}(i)) + \alpha_{SRS,b,f,c}(q_s) \cdot PL_{b,f,c}(q_d)\}$$

wherein $PH_{type3,b,f,c}(i, q_s)$ is the first PH value, $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, $PL_{b,f,c}(q_d)$ is the path loss value, and $10 \log_{10}(2^\mu \cdot M_{SRS,b,f,c}(i))$ is a function with a bandwidth and a subcarrier as variables.

8. The method according to claim 1, wherein the path loss reference signal comprises at least one of a Synchronization Signal Block (SSB), a Channel State Information (CSI) reference signal, or a DownLink Positioning Reference Signal (DL-PRS).

9. The method according to claim 8, wherein when the path loss reference signal is an SSB or a CSI reference signal, the first configuration information further comprises transmit power information of the path loss reference signal; and
when the path loss reference signal is a DL PRS, the transmit power information of the path loss reference signal is specified by a predetermined protocol.

10. The method according to claim 1, further comprising:
sending, to the network device, related information used to indicate at least one of the following:
whether a PH field of a target cell index exists;
the first PH value is transmitted based on an SRS actually for positioning;
the first PH value is transmitted based on a referenced SRS for positioning;
a maximum transmit power of the serving cell; or
whether power fallback is applied to Medium Access Control (MAC) based on power management.

11. A terminal device, comprising:
a memory storing computer-readable instructions; and
a processor coupled to the memory and configured to execute the computer-readable instruction, wherein the computer-readable instructions, when executed by the processor, cause the processor to perform operations comprising:
sending a Power Headroom (PH) value of a serving cell to a network device, wherein the PH value is a first PH value of a first Sounding Reference Signal (SRS) or a second PH value of a second SRS,
wherein the first PH value is obtained based on first configuration information of the first SRS, the first SRS is an SRS used for positioning, and the second SRS is an SRS used for measurement, and
wherein before sending the PH value of the serving cell to the network device, the method further comprises:
calculating a path loss value based on a transmit power of a path loss reference signal and a receive power obtained by measuring the path loss reference signal; and
obtaining the first PH value based on the path loss value, a p0 power value, a path loss coefficient, and a maximum transmit power of the serving cell,
wherein the first configuration information comprises the path loss reference signal, the p0 power value, and the path loss coefficient, and
wherein the path loss reference signal is a signal transmitted by a target cell, and the target cell comprises at least one of the serving cell or a neighboring cell.

12. The terminal device according to claim 11, wherein the operations further comprise:
sending indication information to the network device, wherein the indication information is used to indicate that the PH value is the first PH value or the second PH value.

13. The terminal device according to claim 11, wherein the sending a power headroom PH value of a serving cell to a network device comprises:
sending the PH value to the network device by using a Medium Access Control Control Element (MAC CE).

14. The terminal device according to claim 13, wherein the MAC CE further comprises a bit used to indicate that the PH value is the first PH value or the second PH value.

15. The terminal device according to claim 11, wherein the first configuration information is configured in an information element of an SRS resource set used for positioning.

16. The terminal device according to claim 11, wherein the obtaining the first PH value based on the path loss value, a p0 power value, a path loss coefficient, and a maximum transmit power of the serving cell comprises:
obtaining the first PH value based on the path loss value, the p0 power value, the path loss coefficient, the maximum transmit power of the serving cell, and a power control adjustment value, wherein the power control adjustment value is 0.

17. The terminal device according to claim 11,
wherein the obtaining the first PH value based on the path loss value, a p0 power value, a path loss coefficient, and a maximum transmit power of the serving cell comprises:
when the first PH value is transmitted based on a referenced SRS for positioning, obtaining the first PH value according to the following formula:

$$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d)\}$$

wherein $PH_{type3,b,f,c}(i, q_s)$ is the first PH value, $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, and $PL_{b,f,c}(q_d)$ is the path loss value; or wherein the obtaining the first power headroom PH value based on the path loss value, a pa power value, a path loss coefficient, and a maximum transmit power of the serving cell comprises:
when the first PH value is transmitted based on an SRS actually for positioning, obtaining the first PH value according to the following formula:

$$PH_{type3,b,f,c}(i,q_s) = \tilde{P}_{CMAX,f,c}(i) - \{P_{O\_SRS,b,f,c}(q_s) + 10 \log_{10}(2^\mu \cdot M_{SRS,b,f,c}(i)) + \alpha_{SRS,b,f,c}(q_s) \cdot PL_{b,f,c}(q_d)\}$$

wherein $PH_{type3,b,f,c}(i, q_s)$ is the first PH value, $\tilde{P}_{CMAX,f,c}(i)$ is the maximum transmit power of the serving cell, $P_{O\_SRS,b,f,c}(q_s)$ is the p0 power value, $\alpha_{SRS,b,f,c}(q_s)$ is the path loss coefficient, $PL_{b,f,c}(q_d)$ is the path loss value, and $10 \log_{10}(2^\mu \cdot M_{SRS,b,f,c}(i))$ is a function with a bandwidth and a subcarrier as variables.

18. The terminal device according to claim 11, wherein the path loss reference signal comprises at least one of a Synchronization Signal Block (SSB), a Channel State Information (CSI) reference signal, or a DownLink Positioning Reference Signal (DL-PRS).

19. The terminal device according to claim 18, wherein when the path loss reference signal is an SSB or a CSI reference signal, the first configuration information further comprises transmit power information of the path loss reference signal; and
when the path loss reference signal is a DL PRS, the transmit power information of the path loss reference signal is specified by a predetermined protocol.

20. A network device, comprising:
a memory storing computer-readable instructions; and
a processor coupled to the memory and configured to execute the computer-readable instructions, wherein the computer-readable instructions, when executed by the processor, cause the processor to perform operations comprising:
receiving a Power Headroom (PH) value of a serving cell sent by a terminal device, wherein the PH value is a first PH value of a first Sounding Reference Signal (SRS) or a second PH value of a second SRS,
wherein the first PH value is obtained based on first configuration information of the first SRS, the first SRS is an SRS used for positioning, and the second SRS is an SRS used for measurement,
wherein a path loss value is calculated based on a transmit power of a path loss reference signal and a receive power obtained by measuring the path loss reference signal,
wherein the first PH value is obtained based on the path loss value, a p0 power value, a path loss coefficient, and a maximum transmit power of the serving cell,
wherein the first configuration information comprises the path loss reference signal, the p0 power value, and the path loss coefficient, and
wherein the path loss reference signal is a signal transmitted by a target cell, and the target cell comprises at least one of the serving cell or a neighboring cell.

* * * * *